United States Patent [19]
Gerber

[11] Patent Number: 5,910,260
[45] Date of Patent: Jun. 8, 1999

[54] LASER CUTTER AND METHOD FOR CUTTING SHEET MATERIAL

[75] Inventor: Heinz Joseph Gerber, West Hartford, Conn.

[73] Assignee: Gerber Garment Technology, Inc., Tolland, Conn.

[21] Appl. No.: 08/880,136

[22] Filed: Jun. 20, 1997

Related U.S. Application Data

[63] Continuation of application No. 08/424,809, Apr. 19, 1995, abandoned.

[51] Int. Cl.⁶ .................................................. B23K 26/08
[52] U.S. Cl. .............................. 219/121.67; 219/121.72; 219/121.8
[58] Field of Search .................. 219/121.67, 121.72, 219/121.78, 121.79, 121.82, 121.8, 121.63, 121.64, 121.29; 359/206, 210

[56] References Cited

U.S. PATENT DOCUMENTS

| | | | |
|---|---|---|---|
| 3,514,776 | 5/1970 | Mulready | 343/6 |
| 3,632,205 | 1/1972 | Marcy | 219/121.82 |
| 3,896,362 | 7/1975 | Street | 318/640 |
| 3,942,862 | 3/1976 | Furukawa et al. | 350/16 |
| 4,002,830 | 1/1977 | Brown et al. | 358/293 |
| 4,467,170 | 8/1984 | Hata et al. | 219/121.28 |
| 4,500,182 | 2/1985 | Schumann | 354/4 |
| 4,515,447 | 5/1985 | Weimar et al. | 350/527 |
| 4,532,402 | 7/1985 | Overbeck | 219/121.8 |
| 4,562,332 | 12/1985 | Walter et al. | 219/121.8 |
| 4,600,837 | 7/1986 | DiStefano et al. | 250/235 |
| 4,659,900 | 4/1987 | Gilli et al. | 219/121 LG |
| 4,675,497 | 6/1987 | Pearl et al. | 219/121 LG |
| 4,685,775 | 8/1987 | Goodman et al. | 350/486 |
| 4,725,709 | 2/1988 | Mattelin | 219/121.78 |
| 4,762,994 | 8/1988 | Byerly et al. | 250/236 |
| 4,797,532 | 1/1989 | Maiorov | 219/121.8 |
| 4,831,230 | 5/1989 | Lemelson | 219/121.12 |
| 4,851,656 | 7/1989 | Straayer | 250/201 |
| 4,950,862 | 8/1990 | Kajikawa | 219/121.8 |
| 5,011,282 | 4/1991 | Ream et al. | 356/153 |
| 5,042,338 | 8/1991 | Gerber | 83/34 |
| 5,043,566 | 8/1991 | Andoh et al. | 219/121.8 |
| 5,045,679 | 9/1991 | Suzuki et al. | |
| 5,051,558 | 9/1991 | Sukhman | 219/121.78 |
| 5,067,086 | 11/1991 | Yamazaki et al. | 364/474.08 |
| 5,109,148 | 4/1992 | Fujita et al. | 219/121.78 |
| 5,268,554 | 12/1993 | Ream | 219/121.8 |
| 5,374,804 | 12/1994 | Uchino et al. | 219/121.78 |

FOREIGN PATENT DOCUMENTS

| | | |
|---|---|---|
| 0052892 | 6/1982 | European Pat. Off. . |
| 0 324 032 | 4/1988 | European Pat. Off. . |
| 36 28 480 | 3/1987 | Germany . |
| 39 40 694 | 12/1989 | Germany . |
| 57-47593 | 3/1982 | Japan . |
| 58-13486 | 1/1983 | Japan ............ 219/121.29 |
| 60-106686 | 6/1985 | Japan . |
| 62-151283 | 7/1987 | Japan ............ 219/121.64 |
| 64-15903 | 1/1989 | Japan . |
| 1-162591 | 6/1989 | Japan . |
| 1-228688 | 9/1989 | Japan . |
| 2-155589 | 6/1990 | Japan . |
| 2-217188 | 8/1990 | Japan . |
| 3-131005 | 6/1991 | Japan . |
| 1521931 | 8/1978 | United Kingdom . |
| 2103384 | 2/1983 | United Kingdom . |

*Primary Examiner*—Geoffrey S. Evans
*Attorney, Agent, or Firm*—McCormick, Paulding & Huber

[57] ABSTRACT

In a line tracing laser cutter for sheet material the fundamental axis of beam projection onto the work material is moved by relatively high inertia drive apparatus along a relatively smooth axis trace line, and during such movement the beam is at times shifted by low inertia apparatus from the fundamental axis to cause the beam to follow a line of cut having sharper or more complex features than the axis trace line.

23 Claims, 4 Drawing Sheets

LASER CUTTER AND METHOD FOR CUTTING SHEET MATERIAL

This is a continuation of application Ser. No. 08/424,809 filed on Apr. 19,1995 now abandoned.

FIELD OF THE INVENTION

This invention relates to laser cutters and methods for cutting two dimensional patterns or parts from thin sheet material such as cloth, plastic and metal foils; and deals more particularly with improvements in such a cutter and method permitting increases in cutting accuracy and speed of cut and decreases in cost.

BACKGROUND OF THE INVENTION

As shown for example by U.S. Pat. No. 4,675,497, laser cutters for sheet material are known for cutting parts from thin sheet material and wherein the work material is supported on a support surface, a laser beam is projected onto the work material from a projector part located above the work, and the work material supported on the support surface and projector part are moved relative to one another in two coordinate directions to cause the beam to trace and cut a desired two dimensional line on the sheet material defining the periphery of a desired part. When the pieces of sheet material to be cut are of significant size, as for example in the case of working on sheets of cloth from which clothing, upholstery or air-bag parts are to be cut, the relatively moving parts of the cutter become quite massive so that considerable inertias are associated with the drives for moving the projector part and the work material relative to one another in each of the two coordinate directions. The resulting difficulty in accelerating and decelerating the relatively moving parts has in general made it necessary to operate the cutters at relatively slow speeds in order to cut with reasonable accuracy, especially in cases where the parts to be cut from the work material are of complex shapes requiring the beam to be stopped and restarted, or at least slowed, at corner points or other points at which notches, holes, or other small features of intricate nature are to be cut. Such cutters, capable of cutting at reasonably acceptable speed and accuracy, have also been costly to manufacturer.

The object of this invention therefore is to provide a laser cutter and method of the foregoing character which avoids the drawbacks previously flowing from the high inertias of the two dimensional drive system and which allows complex shapes to be cut from the work material at a more desirable combination of speed and accuracy than has heretofore been possible.

A further object is to provide a laser cutter capable of cutting intricate shapes in sheet material with reasonable speed and accuracy and capable of being made at reasonable cost.

SUMMARY OF THE INVENTION

The invention resides in a line tracing laser cutter for cutting two dimensional parts from thin sheet material with the cutter including a means providing a support surface for supporting sheet work material, a projector part located above the support surface, and a laser generator and associated parts for supplying a laser beam to the projector part and for projecting the beam from the projector part onto the top surface of the work material supported on the support surface and generally parallel to a fundamental axis fixed relative to the projector part, the work material supported on the support surface and the projector part being movable relative to one another by a relatively high inertia drive system in two coordinate directions so that the fundamental beam axis can be moved along a desired two dimensional line on the sheet material. The cutter also includes a low inertia shifter for shifting the beam a limited amount away from the fundamental axis in two coordinate directions. A controller simultaneously controls and coordinates the operation of the drive system for driving the work material and projector part relative to one another and of the beam shifter, the coordination effected by the controller being such that the fundamental axis traces a line of simpler shape than the desired line of cut and such that as the fundamental axis moves along the axis trace line the beam is shifted by the beam shifter as need be to cause it to move and cut along a desired line of cut having sharper or more detailed features than the axis trace line. The simplified trace line followed by the fundamental axis eliminates or reduces the burden of repeated accelerations and decelerations of the high inertia drive system and thereby allows the beam to be moved along the full perimeter of a part in less time than if the fundamental axis were made to exactly trace the desired line of cut.

The invention also resides in a method of laser cutting sheet material using the cutter of the invention and wherein the operation is essentially that of moving the fundamental beam axis along a simplified trace line and during such movement shifting the beam "on the fly" away from the simplified line to cut a more complex line with sharp features such as notches, slits, holes and corners.

The invention also resides in the laser cutter and method being one wherein the intensity or power of the laser beam at its point of encounter with the work material and the speed of the beam along the line of cut are so controlled relative to one another that the cutting energy delivered by the beam to the work material is such that an acceptable cut is achieved along the entire length of the line of cut.

The invention also resides in the cutter including a shutter-like modulator for turning the laser beam on an off under the control of the controller, and in the cutting method being such that the modulator is operated to keep the beam turned off until the fundamental axis reaches a given point on the trace line. The beam is then turned on and the beam shifter operated to cut a two dimensional hole in the work material as the fundamental axis continues along the axis trace line, and after the cutting of the hole is completed the modulator is operated to again turn off the beam. In this way holes of variable size and shape can be easily cut into interior portions of parts cut from the sheet material.

DETAILED DESCRIPTION OF THE PREFERRED EMBODIMENTS

A cutter incorporating the broader aspects of the invention may be implemented in many different ways using different specific components and different forms of motions between the relatively moving components. Therefore, to obtain a clear understanding of the invention in its broader view, reference is first made to FIG. 1 which shows schematically and in a general way the major components of a cutter, indicated generally at 10, embodying the invention.

Figure 1:
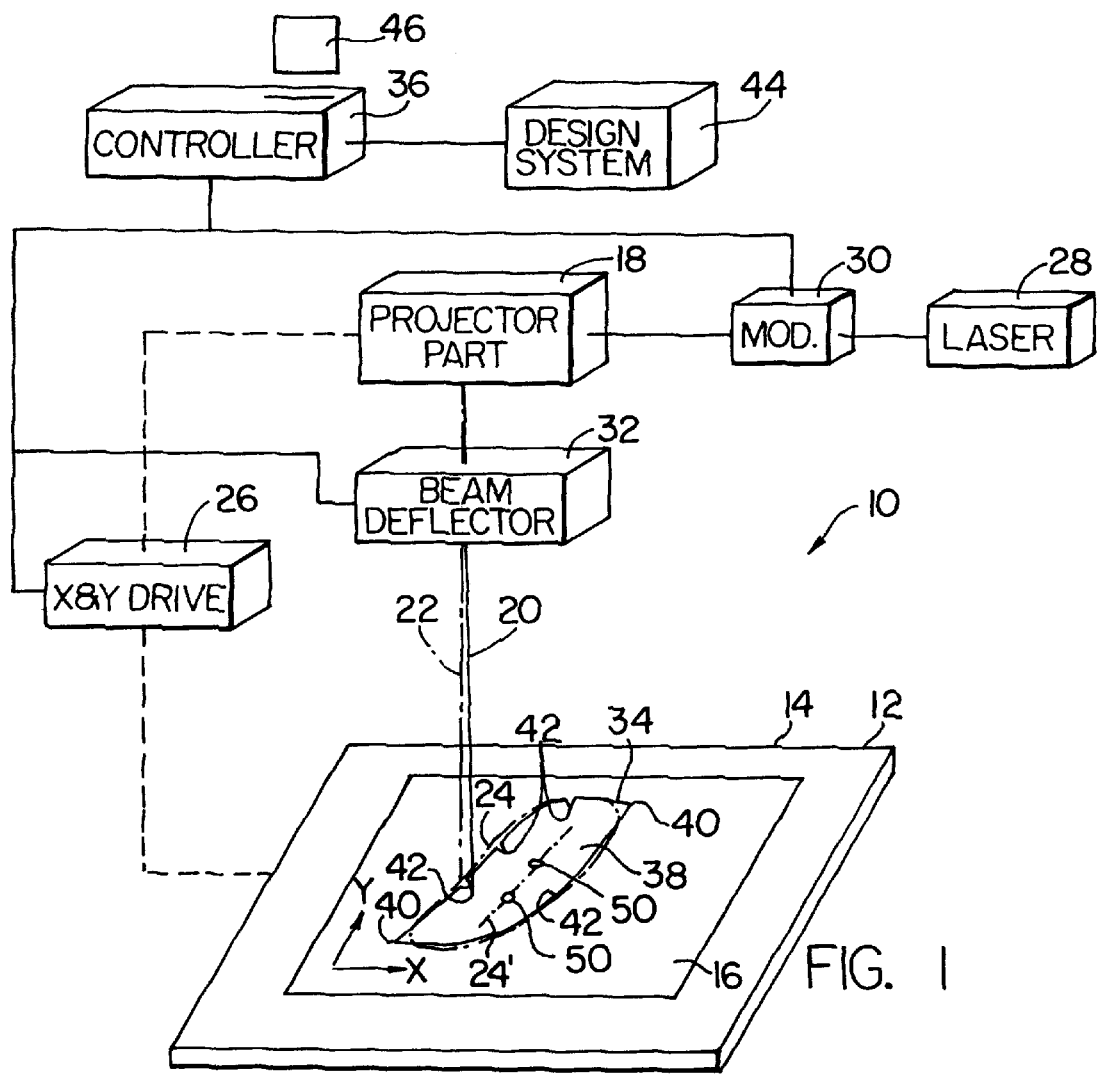
FIG. 1 is a schematic diagram showing in general the basic components of a laser cutter embodying the invention.

Referring to FIG. 1, the cutter 10 includes a means 12 providing a surface 14 for supporting, in spread condition, a sheet 16 of cloth or other thin work material to be cut by the cutter. In the illustrated case, the support surface 14 is shown to be a planar one and the work material 16 is held by suitable means, such as a vacuum, fixed to the support surface 14 during a cutting operation. However, these features are not limiting of the invention and in other cases the support surface 14 may be nonplanar, as for example the external surface of a cylindrical rotatable drum, and the work material 16 may in some cases be slidable relative to the supporting surface 14 in either one or both of the illustrated X and Y coordinate directions.

A projector part 18 is located above the support surface 14 and projects a laser beam 20 downwardly onto the top surface of the work material 16 generally along a fundamental axis 22 which is fixed relative to the projector part 18 and which is oriented generally perpendicularly to the support surface 12 at its point of contact with the work material. The supporting system for the work material 16 and for the projector part 18 is so constructed and arranged that the projector part 18 and work material 16 are moveable relative to one another to allow the fundamental axis 22 to be moved along an axis trace line 24 having components in the two illustrated, X and Y, coordinate directions of the top surface of the sheet material, with such relative motion being accomplished by the illustrated X and Y drive mechanism 26.

As shown in FIG. 1, the X and Y drive mechanism 26 achieves relative two dimensional movement between the projector part 18 and work material 16 by controlling the positional relationship between the projector part 18 and the support surface 14 with the sheet material being fixed to the support surface for movement therewith. However, in cases where the sheet material is moved in one or both coordinate directions over a support surface the X and Y drive mechanism 26 may act directly on the sheet material 16 as for example through sprocket wheels or frictional drive wheels directly engaging the work material. It will also be understood that to obtain the relative motion between the projector part and the work material in the desired two coordinate directions, either one of the elements comprising the projector part and the work material may be held stationary in either one or both of the coordinate directions while the other element is moved in the other coordinate direction or in both coordinate directions.

The laser beam 20 is provided by a laser generator 28 with the beam output from the generator being supplied in an acceptable way to the projector part 18 for projection generally along the fundamental axis 22. At some point along its path the beam 20 passes through a shutter-like modulator 30 which permits the portion of the beam reaching the sheet material 16 to be turned between on and off conditions.

In accordance with the invention, the cutter 10 of FIG., 1 also includes a beam shifter 32 operable to shift the beam 20 in two coordinate directions away from the fundamental axis 22. The shifter 22 may be located either in advance of or following the projector part 18, with respect to the direction of the beam, and may take various different forms, but in any event its inertia associated with the shifton of the beam in either of the two coordinate directions away from the axis 22 is very low in comparison to the inertia associated with the X and Y drive mechanism 26 for moving the projector part 18 and work material relative to one another in the two related coordinate directions. Therefore, as the fundamental axis 22 is moved by the operation of the X and Y drive mechanism 26 along the axis trace line 24 the beam 20 may be made, by operation of the beam shifter 32, to deviate from the axis trace line 24 so as to move along and cut a line 34 having a shape somewhat different from the axis trace line 24.

In further keeping with the invention, the cutter 10 of FIG. 1 includes a controller 36 simultaneously controlling the operation of the x and Y drive mechanism 26 and of the beam shifter 32. The operation of the controller is such that in cutting a part 38 from the sheet material 16 the axis trace line 24 followed by the fundamental axis 22 is of a simpler shape than that of the desired line of cut 34 followed by the beam 20. That is, as shown in FIG. 1, the desired line of cut 34 includes a number of sharp features such as the illustrated corners 40 and notches 42. The associated axis trace line 24 is, however, a simplified version of the desired line of cut 34, it extending smoothly past the notches 42 and at the corners 40 having smoothly rounded profiles. Along portions of the desired line of cut 34 the line of cut is relatively smooth; and along these portions the line of cut 34 and the axis trace line 24 coincide with one another with the beam 20 being unshifted from the axis 22. When the axis 22 reaches the location of a notch 42 or corner 40, however, the beam shifter 32 is operated, while the axis 22 continues to travel along the axis trace line 24, to shift the beam to cut the associated notch 42 or corner 40.

The controller operates the X and Y drive mechanism 26 to move the fundamental axis 22 along the axis trace line 24 by executing instructions defining the axis trace line, which instructions may be provided in any suitable way such as by the illustrated design system 44, and those instructions may also include instructions for causing the controller 36 to operate the beam shifter 32 in the proper way to shift the beam 20 as desired when the axis 22 in moving along the axis trace line 24 reaches and passes by the location of a sharp corner 40, notch 42 or other feature to be included in the part 38 cut from the sheet material. As an alternative, however, sets of instructions to be used for controlling the beam shifter 22 to cut standard features such as certain notches, slits or corners may be recorded on a memory card 46 or the like insertable into the controller 36. Then the instructions provided to the controller by the design system 44 or the like may be such that when the axis 22 reaches a given point along the axis trace line 24 where the shape of a given feature departing from the axis trace line is to be followed by the beam, the associated set of instructions is retrieved from the memory card and executed by the controller.

It will be understood that if the fundamental axis 22 is moved along the axis trace line 24 at a substantially steady speed, the beam 20 when it is shifted from the fundamental axis 22 to cut extra features will move at higher rates of speed along the line of cut 34 than at times when it is not shifted to cut such extra features. Therefore, to assure successful cutting it may be necessary to control the relationship between the power of the beam 20 and its speed of movement along the line of cut 34 so that sufficient power is delivered along the entire length of the line 34 to assure complete cutting. This relationship can be obtained by maintaining the power of the beam 20 at a substantially constant value and controlling the speed of the fundamental axis 22 along the axis trace line 24 in such a way that such speed is decreased at times when the beam is shifted from the fundamental axis 22 for the purpose of cutting extra features. Another way of obtaining the relationship is to provide a power control circuit 29 for the laser generating unit 28 which circuit 29 is controlled by the controller 36 and is effective to adjust the power level of the laser beam 20 as output from the unit 28. Then, if desired, the fundamental axis 22 may be moved along the axis trace line at a substantially steady speed and at times when the beam 20 is shifted from the fundamental axis 22 to cut an extra feature, such one of the illustrated notches 42, the power control unit 29 is commanded by the controller 36 to increase the power of the laser beam 20 as needed to achieve proper cutting.

The controller 36 also operates the modulator 30 so that the beam can be turned on when desired for cutting along the line 34 and can be turned off at other times. This feature also allows the efficient cutting of holes of various shapes and sizes in the interior of a cut part 38. Two such holes are shown for example at 50 in FIG. 1. For the cutting of these holes the fundamental axis 22 is moved along a line, such as indicated at 24', passing through the desired locations of the holes 50. When moving toward the location of a hole the modulator is operated to keep the beam 20 turned off. When the location of a hole is reached the modulator 30 is turned on and at the same time the beam shifter 32 is operated to shift the beam 20 from the line 24' in such way as to follow the outline of the desired hole shape. After the cutting of the hole is finished the modulator 30 again turns the beam off until the axis 22 reaches the location of the next hole, at which time the process is repeated.

Figure 2:
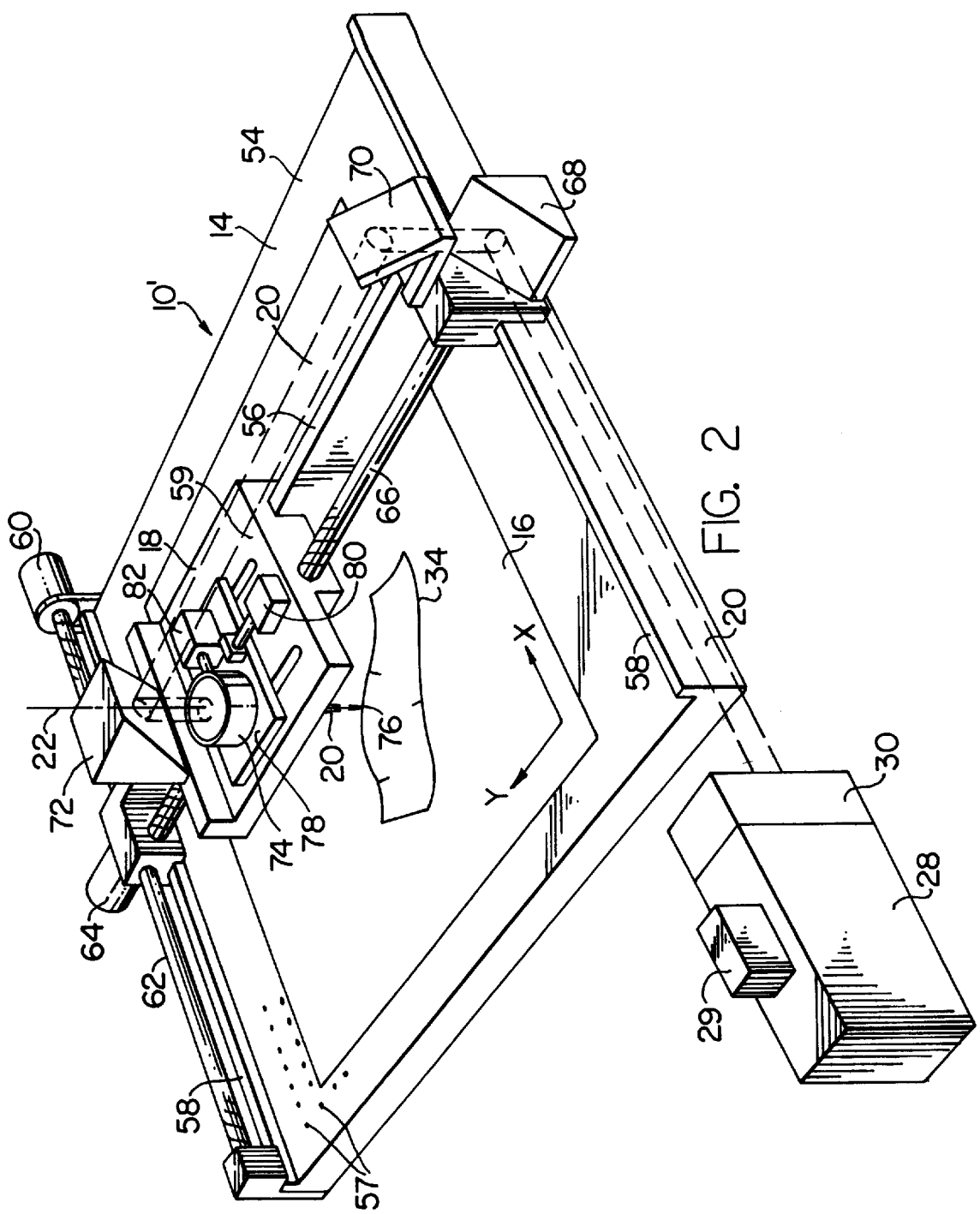
FIG. 2 is a perspective view showing a more specific embodiment of the invention.

FIG. 2, by way of example, shows a more specific embodiment of the invention with the controller 36 and design system 44 of FIG. 1 being omitted. In these figures those components which are similar to the ones shown in FIG. 1 have been given the same reference numerals as in FIG. 1. The cutter of FIG. 2 is indicated generally at 10' and includes a table 54 providing a stationary planar and upwardly facing support surface 14 for receiving the work material 16. A vacuum system including holes 57 distributed over the surface 14, to which vacuum can be supplied from chambers located below the surface 14, can be used to fix the sheet material 16 to the surface 14 during a cutting operation.

The projector part 18 of the cutter 10' comprises a carriage located above the surface 14 and movable relative to the surface 14 and the work material 16 in the illustrated Y coordinate direction by sliding movement along the length of an X carriage or bridge 57 extending in the Y coordinate direction and straddling the surface 14. The carriage 57 is in turn movable in the illustrated x coordinate direction along ways 58 extending in the X coordinate direction at opposite sides of the table 14.

In the cutter 10' of FIG. 2 the X and Y drive 26 of FIG. 1, for producing relative motion between the carriage 18 and the work material 16 in the X coordinate direction, includes an X axis motor 60 and lead screw 62 which together, when the motor 60 is operated, move the carriage 56 in the X coordinate direction; and the Y axis portion of the drive 26 comprises a motor 64 and associated lead screw 66 which, when the motor 64 is operated, move the carriage 18 in the Y coordinate direction. The illustrated fundamental axis 22 is fixed relative to the carriage 18, and therefore by combined operation of the motors 60 and 64, under control of the controller 36, the carriage 18 may be moved simultaneously in the x and Y coordinate directions to move the axis 22' along a given axis trace line on the sheet material 16.

In the cutter 10' of FIG. 2 the laser generator 28 and modulator 30 are located apart from the table 54 and the laser beam 20 is provided to the carriage 18 by a pair of mirrors 68 and 70 fixed to the X carriage 56. At the carriage 18 the beam 20 is shifted downwardly, by a mirror 72 fixed to the carriage 18, and through an objective lens or lens system 74 which focuses the beam 20 to a small point 76 at the top surface of the work material 16, thereby giving the beam a power density at the top surface of the work material sufficient to cut the material as the beam is moved along the illustrated desired line of cut 34.

In the cutter 10 of FIG. 2 the beam shifter 32 of FIG. 1 is implemented by means of a low inertia mechanism for moving the lens 74 in X and Y coordinate directions relative to the carriage 18 to shift the position of the beam 20 exiting the lens 74 in X and Y coordinate directions, respectively, relative to the axis 22.

The mechanism for moving the lens 74 in X and Y coordinate directions relative to the carriage 18 may take various different forms, and in the illustrated case of FIG. 2 includes a stage 78 slidably supported on the carriage 18 for movement in the Y coordinate direction and positioned in that coordinate direction by a servo motor 80 connected between the carriage 18 and the stage 78. The lens 74 in turn is slidably supported on the stage 78 for movement in the x coordinate direction and is positioned in that coordinate direction by a motor 82 operating between the stage 78 and the lens 74. The motors 80 and 82 are in turn energized under the control of the controller 36 of FIG. 1.

Figure 3:
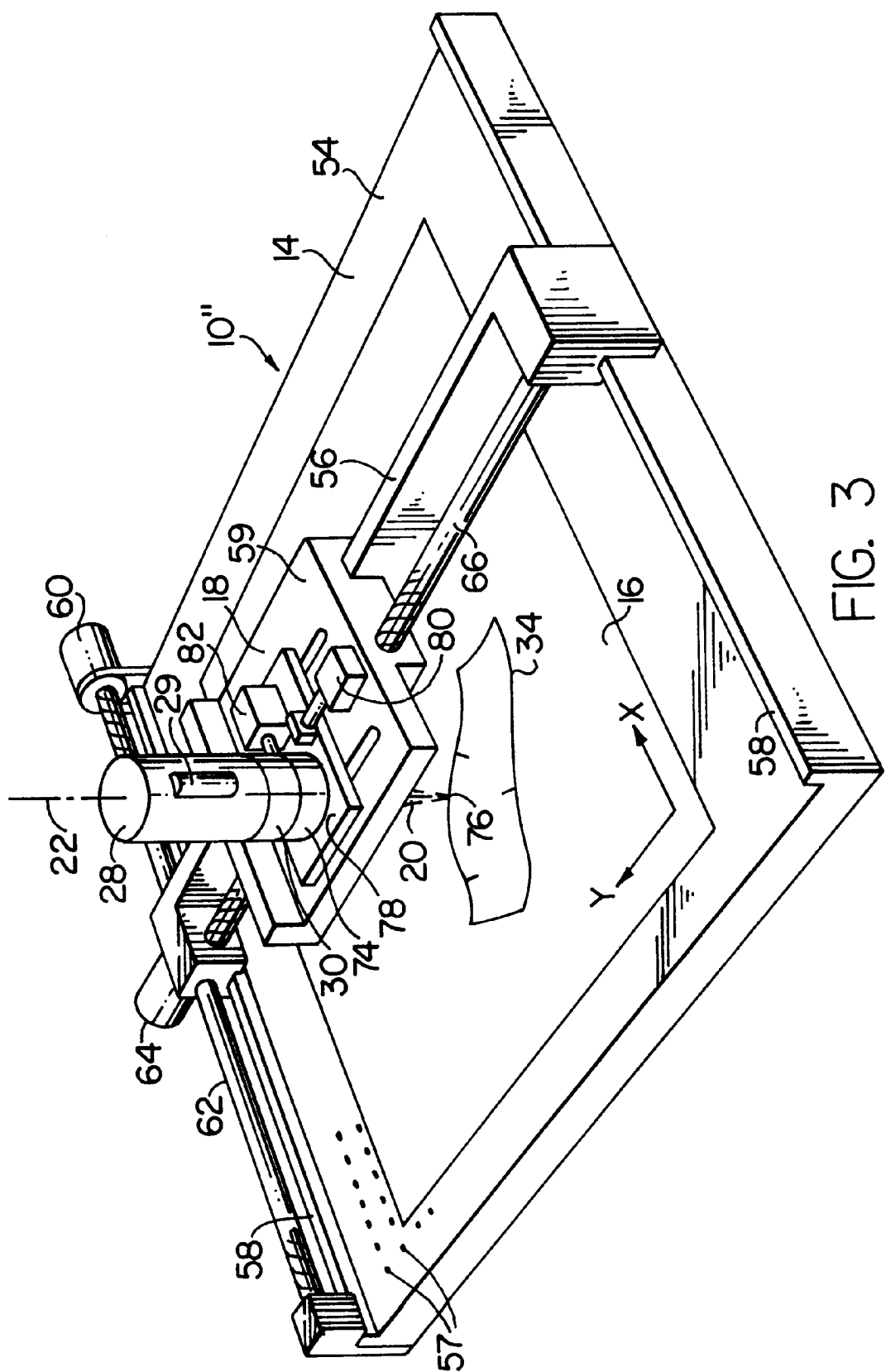
FIG. 3 is a perspective view showing a laser cutter comprising another embodiment of the invention.

A further embodiment of the invention is shown by FIG. 3 and comprises a cutter indicated generally at 10". This cutter is in many respects similar to that of FIG. 2 and parts of it which are the same as those of the FIG. 2 cutter have been given the same reference numerals as in FIG. 2 and need not be further described.

The cutter 10" of FIG. 3 differs from that of FIG. 2 in that the laser generator 28 instead of being located separate from the table 54, as in FIG. 2, is mounted directly to the stage 78 of the carriage 18 along with the modulator 30, power control circuit 29 and an objective lens unit 74. Thereby the beam 20 can be shifted in two coordinate directions from the fundamental axis 22, fixed relative to the carriage 18, by means of the motor 80 moving the stage 78 in the Y coordinate direction relative to the carriage 18 and by the motor 82 moving the laser generating unit 28, power control circuit 29, modulator 30 and lens unit 74 together in the X coordinate direction.

Figure 4:
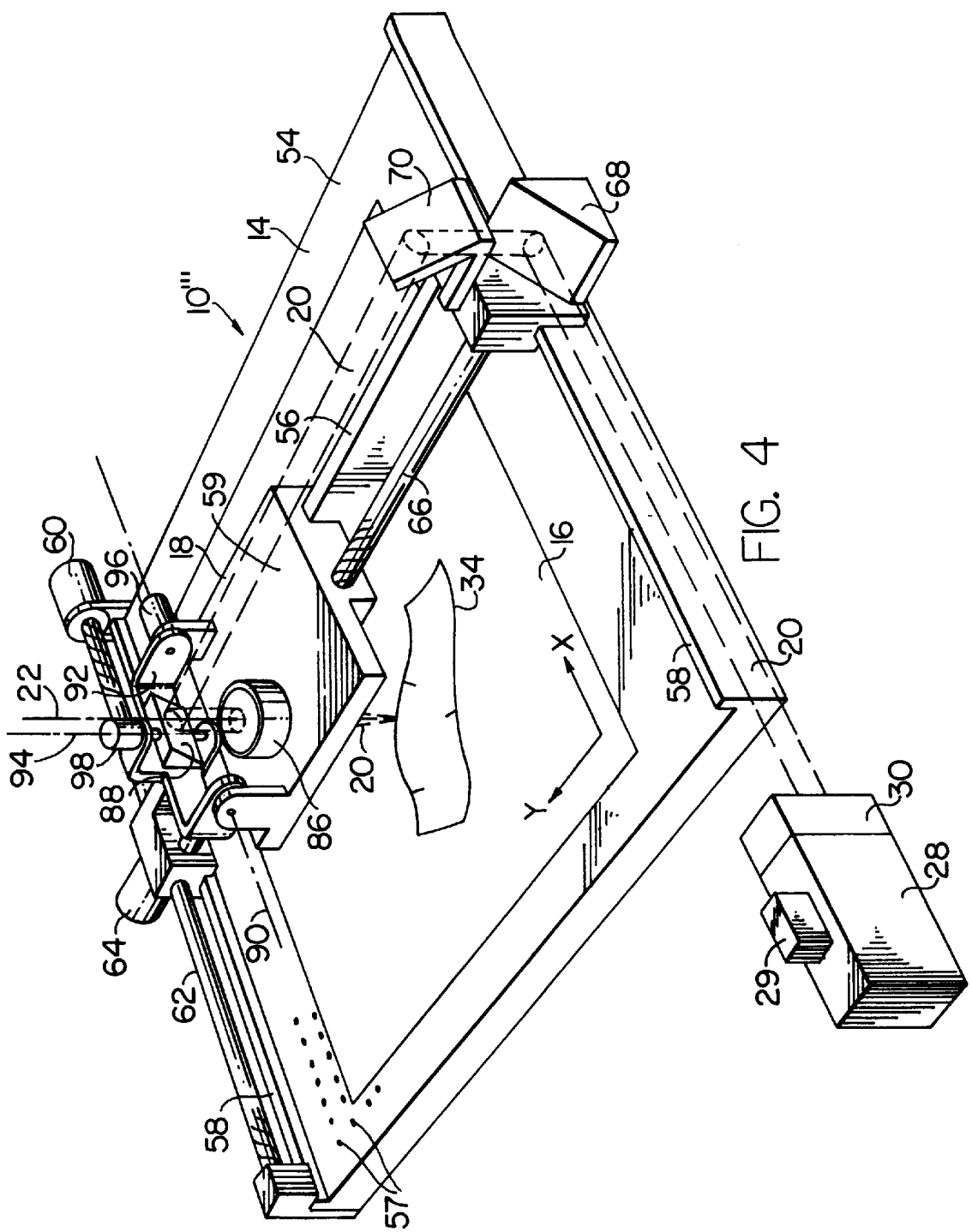
FIG. 4 is a perspective view showing a laser cutter comprising a still further embodiment of the invention.

A still further embodiment of the invention is shown in FIG. 4 and comprises a cutter indicated generally at 10'''. This cutter is also in many respects similar to that of FIG. 2 and in FIG. 4 the same reference numerals have been used as in FIG. 2 to indicate parts of FIG. 4 which are identical to those of FIG. 2.

In the cutter 10''' the carriage 18 carries an objective lens unit 86 fixed relative to the carriage 18 and the means for shifting the laser beam 20 relative to the fundamental axis 22 comprises a mirror 88 tiltable about two orthogonal coordinate axes to change the angle of incidence of the beam with respect to the lens unit 86. The first of these axes is an axis 90 which is the axis of rotation of a yoke 92 relative to the carriage 18. The second of these axes is a vertical axis 94 which is the axis of rotation of the mirror 88 relative to the yoke 92. Rotation of the mirror about the axis 90 is achieved by the motor 96 which positions the yoke 92 relative to the carriage 18 about the axis 90; and rotation of the mirror about the axis 94 is achieved by a similar motor 98 which positions the mirror relative to the yoke about the axis 94. Both motors 96 and 98 are controlled by the controller 36 of FIG. 1. The objective lens unit 86 is preferable to an f-theta one so that the laser beam 20 is kept sharply in focus, at its point of encounter with the top surface of the work material 16, as it is shifted relative to the fundamental axis 22.

I claim:

1. A line tracing energetic beam apparatus for processing work material along a desired two-dimensional processing line of pregiven configuration to produce a processed line having said pregiven configuration, said apparatus comprising:

means providing data defining said processing line of pregiven configuration, means providing a support surface for supporting work material having a top surface, a beam projector part located above said support surface, means associated with said projector part for projecting an energetic beam from said projector part toward said support surface generally parallel to a fundamental axis fixed relative to said projector part and generally perpendicular to said support surface, drive means for moving work material supported on said support surface and said projector part relative to one another in two X and Y coordinate directions to move said fundamental axis along a two-dimensional axis trace line on the top surface of said work material, a beam shifter for laterally shifting said beam in said two X and Y coordinate directions away from said fundamental axis, and a controller for simultaneously controlling the operation of said drive means and of said beam shifter in response to said data so that while said fundamental axis moves along said axis trace line said energetic beam traces said desired two-dimensional processing line of pregiven configuration on said top surface of said work material to process said work material along said processing line and to thereby produce said processed line having said pregiven configuration.

2. A line tracing energetic beam apparatus as defined in claim 1 further characterized by:

said beam shifter having relatively low inertias in said two coordinate directions of beam shifting in comparison to the inertias of said drive means in said two coordinate directions of relative motion between said projector part and said work material, so that in its movement along said processing line of pregiven configuration on the top surface of said sheet material said beam can be accelerated and decelerated more easily through the use of said beam shifter than through the use of said drive means.

3. A line tracing energetic beam apparatus as defined in claim 1 further characterized by:

means for maintaining said beam at its point of encounter with the work material supported on said support surface at a power level sufficient to perform the desired processing of said work material as it traces said processing line of pregiven configuration on said top surface of said work material.

4. A line tracing energetic beam apparatus as defined in claim 1 further characterized by:

said means providing a support surface being a table defining said support surface with said support surface being planar.

5. A line tracing energetic beam apparatus as defined in claim 4 further characterized by:

said drive means for moving said work material and said projector part relative to one another in said two coordinate directions being a bridge located above said support surface and extending in a Y coordinate direction across said support surface, means for supporting said bridge and said support surface for movement relative to one another in said X coordinate direction, means for moving said bridge and said support surface relative to one another in said X coordinate direction, means mounting said projector part on said bridge for movement along said bridge in said Y coordinate direction, and means for moving said projector part relative to said bridge in said Y coordinate direction.

6. A line tracing energetic beam apparatus as defined in claim 5 further characterized by:

said table having a stationary frame, and said means for supporting said bridge and said support surface for movement relative to one another in said X coordinate direction being means mounting said bridge to said table frame for movement of said bridge relative to said table frame in said X coordinate direction.

7. A line tracing energetic beam apparatus as defined in claim 1 further characterized by:

axis trace defining means providing a set of instructions for use by said controller in accordance with which said controller controls said means for moving said work material and said projector part relative to one another in said X and Y coordinate directions so that said fundamental axis follows said axis trace line, and means providing a set of beam shifting instructions for use by said controller and in accordance with which said beam shifter is operated by said controller to cause said beam to execute a given shifting routine in said X and Y coordinate directions relative to said fundamental axis, said axis trace defining means including instructions causing said controller to start execution of said set of beam shifting instructions in response to said fundamental axis reaching a given point along said axis trace line and to execute said set of beam shifting instructions while said fundamental axis is continued to be moved along said axis trace line forwardly beyond said given point on said axis trace line.

8. A line tracing energetic beam apparatus as defined in claim 1 further characterized by:

a modulator controlled by said controller for turning said beam on and off.

9. A line tracing energetic beam apparatus as defined in claim 1 further characterized by:

said energetic beam being a laser beam, said beam shifter comprising an objective lens carried by said projector part, and means for moving said objective lens in said two coordinate directions relative to said projector part.

10. A line tracing energetic beam apparatus as defined in claim 1 further characterized by:

said energetic beam being a laser beam, said beam shifter comprising a laser generator carried by said projector part, and means for moving said laser generator in said two coordinate directions relative to said projector part.

11. A line tracing energetic beam apparatus as defined in claim 1 further characterized by:

said energetic beam being a laser beam, said beam shifter being an objective lens fixed to said projector part, a mirror for deflecting said laser beam onto said lens, and means for tilting said mirror in two coordinate directions relative to said lens to vary in said two coordinate directions the angle of incidence of said beam relative to said lens.

12. A line tracing laser beam apparatus as defined in claim 11 further characterized by:

said objective lens being an f-theta lens.

13. A line tracing energetic beam apparatus as defined in claim 1, wherein:

said energetic beam is a laser beam, said work material is sheet material, and said processing of said work material is cutting of said sheet material by said laser beam along said processing line of pregiven configuration.

14. A line tracing energetic beam apparatus as defined in claim 1, further comprising:

a means providing said controller with drive means control signals causing said controller to operate said drive means such that said axis trace line is a simplified version of said processing line of desired configuration, and a means providing said controller with beam shifter control signals causing said controller to operate said beam shifter, during movement of said fundamental axis along said axis trace line, such that said beam traces said processing line of pregiven configuration on said top surface of said work material.

15. A line tracing energetic beam apparatus for processing work material along a desired two-dimensional processing line, said apparatus comprising:

means providing a support surface for supporting work material having a top surface, a beam projector part located above said support surface, means associated with said projector part for projecting an energetic beam from said projector part toward said support surface generally parallel to a fundamental axis fixed relative to said projector part and generally perpendicular to said support surface, drive means for moving work material supported on said support surface and said projector part relative to one another in two X and Y coordinate directions to move said fundamental axis along a two-dimensional axis trace line on the top surface of said work material, a beam shifter for laterally shifting said beam in said two X and Y coordinate directions away from said fundamental axis, a controller for simultaneously controlling the operation of said drive means and of said beam shifter so that while said fundamental axis moves along said axis trace line said energetic beam traces said desired two-dimensional processing line on said top surface of said work material which processing line is of more complicated shape than said axis trace line, and means for maintaining said beam at its point of encounter with the work material supported on said support surface at a power level sufficient to perform the desired processing of said work material as it traces said desired processing line on said top surface of said work material, said means for maintaining said beam at said power level including means for maintaining said laser beam at a substantially constant power level as said fundamental axis is moved along said axis trace line, and means for slowing the speed of movement of said fundamental axis along said axis trace line at times when said beam is shifted from said fundamental axis to process extra features.

16. A line tracing energetic beam apparatus for processing work material along a desired two-dimensional processing line, said apparatus comprising:

means providing a support surface for supporting work material having a top surface, a beam projector part located above said support surface, means associated with said projector part for projecting an energetic beam from said projector part toward said support surface generally parallel to a fundamental axis fixed relative to said projector part and generally perpendicular to said support surface, drive means for moving work material supported on said support surface and said projector part relative to one another in two X and Y coordinate directions to move said fundamental axis along a two-dimensional axis trace line on the top surface of said work material, a beam shifter for laterally shifting said beam in said two X and Y coordinate directions away from said fundamental axis, a controller for simultaneously controlling the operation of said drive means and of said beam shifter so that while said fundamental axis moves along said axis trace line said energetic beam traces said desired two-dimensional processing line on said top surface of said work material which processing line is of more complicated shape than said axis trace line, and means for maintaining said beam at its point of encounter with the work material supported on said support surface at a power level sufficient to perform the desired processing of said work material as it traces said desired processing line on said top surface of said work material, said means for maintaining said beam at said power level including means for moving said fundamental axis along said axis trace line at a substantially steady speed and means for increasing the power of said beam at times when said beam is shifted from said fundamental axis to process extra features.

17. The method of processing work material supported on a support surface by means of an energetic beam projected onto the top surface of such work material and moved along said processing line, said method comprising:

supporting work material with a top surface on a support surface, providing a projector part movable above said support surface and having a fundamental axis fixed relative to said projector part and extending to said support surface, moving said work material supported on said support surface and said projector part relative to one another in X and Y coordinate axes to cause said fundamental axis to follow an axis trace line on said top surface of said work material, projecting an energetic beam from said projector part generally along said fundamental axis and onto said top surface of said work material, while said projector part and work material are moved relative to one another laterally shifting said beam relative to said fundamental axis in said X and Y coordinate axes so that said beam traces a beam trace line on said top surface of said sheet material which beam trace line deviates from said axis trace line and is of more complex shape than said axis trace line, maintaining said beam at a substantially constant power level as said fundamental axis is moved along said axis trace line, and slowing said movement of said fundamental axis along said axis trace line at times when said beam is shifted from said fundamental axis to process extra features.

18. The method of processing work material supported on a support surface by means of an energetic beam projected onto the top surface of such work material and moved along said processing line, said method comprising:

supporting work material with a top surface on a support surface, providing a projector part movable above said support surface and having a fundamental axis fixed relative to said projector part and extending to said support surface, moving said work material supported on said support surface and said projector part relative to one another in X and Y coordinate axes to cause said fundamental axis to follow an axis trace line on said top surface of said work material, projecting an energetic beam from said projector part generally along said fundamental axis and onto said top surface of said work material, while said projector part and work material are moved relative to one another laterally shifting said beam relative to said fundamental axis in said X and Y coordinate axes so that said beam traces a beam trace line on said top surface of said sheet material which beam trace line deviates from said axis trace line and is of more complex shape than said axis trace line, performing said step of moving said work material and projector part relative to one another in such way that said fundamental axis follows said axis trace line at a substantially steady speed, and increasing the power of said beam in response to the shifting of said beam away from said fundamental axis to process extra features.

19. A method of processing work material supported on a support surface along a processing line of pregiven configuration by means of an energetic beam projected onto the top surface of such work material and moved along said processing line to produce a processed line having said pregiven configuration, said method comprising:

providing data defining said processing line of pregiven configuration, supporting work material with a top surface on a support surface, providing a projector part movable above said support surface and having a fundamental axis fixed relative to said projector part and extending to said support surface, moving said work material supported on said support surface and said projector part relative to one another in X and Y coordinate axes in response to said data to cause said fundamental axis to follow an axis trace line on said top surface of said work material, which axis trace line corresponds generally to but is of a configuration somewhat different from said pregiven configuration of said processing line, projecting an energetic beam from said projector part generally along said fundamental axis and onto said top surface of said work material, and while said projector part and work material are moved relative to one another laterally shifting said beam relative to said fundamental axis in said X and Y coordinate axes in response to said data so that said beam moves along said processing line of pregiven configuration on said top surface of said sheet material and processes said sheet material along said processing line of pregiven configuration to produce said processed line of said pregiven configuration.

20. The method defined in claim 19 further characterized by:

modulating said energetic beam between on and off conditions as said support surface and projector part are moved relative to one another.

21. The method defined in claim 20 further characterized by:

said work material being sheet material, said energetic beam being a laser beam, said processing of said work material being cutting of said work material by said laser beam along said processing line of pregiven configuration, as said fundamental axis is moved along a part of said axis trace line turning said beam off so that no cutting of said work material occurs, when said fundamental axis reaches a given point along said trace line turning said beam on, continuing movement of said fundamental axis along said trace line, and shifting said beam away from said fundamental axis to cut a hole in said sheet material, and after said hole is cut turning said beam off and continuing movement of said fundamental axis along said axis trace line.

22. A method of processing work material as defined in claim 19, wherein:

said energetic beam is a laser beam, said work material is sheet material, and said processing of said work material is cutting of said sheet material by said laser beam along said processing line of pregiven configuration.

23. The method defined in claim 19 and further comprising:

defining said two-dimensional processing line of desired configuration on said top surface of said work material, providing a first set of control signals defining a simplified version of said processing line, in moving said work material and projecting part relative to one another performing said movement in response to said first set of control signals so that said fundamental axis moves along said simplified version of said processing line, providing a second set of control signals so related to said first set of control signals that when said second set of control signals is used, simultaneously with the movement of said work material and projector part relative to one another in response to said first set of control signals, to perform said shifting of said beam relative to said fundamental axis said shifting of said beam complements said relative movement of said work material and projector part to cause said beam to follow said processing line of pregiven configuration, and in shifting said beam relative to said fundamental axis using said second set of controls signals to perform said shifting simultaneously with the movement of said fundamental axis along said simplified version of said desired processing line.

* * * * *